(12) United States Patent
Obana et al.

(10) Patent No.: US 11,773,534 B2
(45) Date of Patent: Oct. 3, 2023

(54) METAL CORD, METAL CORD/RUBBER COMPOSITE AND CONVEYOR BELT

(71) Applicant: BRIDGESTONE CORPORATION, Tokyo (JP)

(72) Inventors: Naohiko Obana, Tokyo (JP); Yoshiaki Oono, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 501 days.

(21) Appl. No.: 17/251,313

(22) PCT Filed: Jun. 12, 2019

(86) PCT No.: PCT/JP2019/023335
§ 371 (c)(1),
(2) Date: Dec. 11, 2020

(87) PCT Pub. No.: WO2019/240190
PCT Pub. Date: Dec. 19, 2019

(65) Prior Publication Data
US 2021/0254279 A1 Aug. 19, 2021

(30) Foreign Application Priority Data
Jun. 12, 2018 (JP) .................................. 2018-112305

(51) Int. Cl.
*D07B 1/06* (2006.01)
*B65G 15/36* (2006.01)

(52) U.S. Cl.
CPC ........... *D07B 1/0613* (2013.01); *B65G 15/36* (2013.01); *D07B 1/0626* (2013.01); *D07B 2201/2023* (2013.01); *D07B 2201/2061* (2013.01); *D07B 2205/3071* (2013.01); *D07B 2205/3089* (2013.01); *Y10T 428/12792* (2015.01)

(58) Field of Classification Search
None
See application file for complete search history.

(56) References Cited

U.S. PATENT DOCUMENTS

| 4,143,209 A | 3/1979 | Gerspacher et al. |
| 2003/0106300 A1 | 6/2003 | Bruyneel et al. |

(Continued)

FOREIGN PATENT DOCUMENTS

| EP | 786539 A2 * | 7/1997 | ............... C25D 3/22 |
| EP | 807697 B1 * | 8/2003 | ............... C25D 3/22 |

(Continued)

OTHER PUBLICATIONS

International Search Report for PCT/JP2019/023335 dated Aug. 20, 2019 (PCT/ISA/210).

*Primary Examiner* — Seth Dumbris
(74) *Attorney, Agent, or Firm* — Sughrue Mion, PLLC

(57) ABSTRACT

The present invention provides a metal cord having better adhesion to rubber compared to a conventional one, as well as a metal cord-rubber composite and a conveyor belt, including the same. In a metal cord (10) composed of a plurality of metal filaments (11) twisted together, the surfaces of the metal filaments (11) constituting the outermost layer are each provided with a zinc plating layer (16), and the degrees of crystal orientation of the (002) plane and the (102) plane of the surface of the zinc plating layer (16) are less than 120.

20 Claims, 1 Drawing Sheet

(56) References Cited

U.S. PATENT DOCUMENTS

| | | | |
|---|---|---|---|
| 2012/0061250 A1* | 3/2012 | Ahmed | H01L 31/0326 205/310 |
| 2015/0337427 A1* | 11/2015 | Suzuki | C22C 38/06 428/659 |
| 2020/0131700 A1 | 4/2020 | Obana et al. | |

FOREIGN PATENT DOCUMENTS

| | | |
|---|---|---|
| GB | 2 063 725 A | 6/1981 |
| GB | 2 092 921 A | 8/1982 |
| JP | 54-4250 A | 1/1979 |
| JP | 54-004250 A | 1/1979 |
| JP | 56-86639 A | 7/1981 |
| JP | 56-086639 A | 7/1981 |
| JP | 5-44058 A | 2/1993 |
| JP | 5-044058 A | 2/1993 |
| JP | 2003-532808 A | 11/2003 |
| JP | 2011-202291 A | 10/2011 |
| JP | 2016-106178 A | 6/2016 |
| WO | 2019/004392 A1 | 1/2019 |
| WO | 2019/004392 A1 | 3/2019 |

\* cited by examiner

METAL CORD, METAL CORD/RUBBER COMPOSITE AND CONVEYOR BELT

CROSS REFERENCE TO RELATED APPLICATIONS

This application is a National Stage of International Application No. PCT/JP2019/023335 filed Jun. 12, 2019, claiming priority based on Japanese Patent Application No. 2018-112305 filed Jun. 12, 2018.

TECHNICAL FIELD

The present invention relates to a metal cord, a metal cord composite and a conveyor belt. More specifically, the present mention relates to a metal cord having better adhesion to rubber compared to a conventional one as well as a metal cord-rubber composite and a conveyor belt, including the same.

BACKGROUND ART

A conveyor belt includes steel cords for reinforcement which are embedded therein along the circumferential direction of the belt, so that the tensile strength (belt strength) of the conveyor belt along the circumferential direction of the belt is increased. The steel cords for reinforcement are usually plated with zinc, which is excellent in corrosion resistance. This is because the steel cords embedded in a conveyor belt are more likely to be exposed to the external air, due to damage of the conveyor belt caused by the articles being conveyed, and thus are susceptible to corrosion. However, zinc plating is known to be inferior in adhesion to rubber, as compared to brass plating, which is used in tires and the like.

In view of such circumstances, Patent Document 1 proposes a steel cord for reinforcement composed of a plurality of strands twisted together, each strand including a plurality of outermost layer filaments constituting an outer periphery portion, and an inner filament(s) located inside these outermost layer filaments. In the above-described steel cord, the outermost layer filaments in the outermost layer strands constituting the outer periphery portion of the steel cord for reinforcement, among the plurality of strands, are provided with a brass plating, treatment, and at least one filament located inside the outermost layer strands, is provided with a zinc plating treatment. By this arrangement, the adhesion of the steel cords to rubber is improved, while ensuring the reinforcement of the resulting rubber article.

RELATED ART DOCUMENT

Patent Document 1: JP 2011-202291 A

SUMMARY OF THE INVENTION

Problems to be Solved by the Invention

Today, a further improvement in durability is required for conveyor belts, and a further study is needed for improving the adhesion of metal cords for reinforcement, such as steel cords, to rubber.

Therefore, an object of the present invention is to provide a metal coni having better adhesion to rubber compared to a conventional one, as well as a metal cord-rubber composite and a conveyor belt, including the same.

Means for Solving the Problems

The present inventors have obtained the following findings, as a result of intensive studies to solve the above mentioned problems. In other words, the inventors have carried out a running test using a conveyor belt in which steel cords subjected to zinc plating are used as reinforcing materials, and performed a micro-analysis of the zinc-plated surfaces of the steel filaments in the outermost layer, to find out that cracks have occurred on the zinc-plated surfaces. A further observation of the zinc-plated surfaces at which the cracks occurred yielded the finding that twinning deformation has occurred on the surface of the (102) plane with a high degree of crystal orientation. As a result of more intensive studies based on such findings, the present inventors have found out that the above mentioned problems can be solved by controlling the crystal structure of zinc to a predetermined one, thereby completing the present invention.

In other words, the metal cord according to the present invention is a metal cord composed of a plurality of metal filaments twisted together,
characterized in that surfaces of the metal filaments constituting an outermost layer are each provided with a zinc plating layer,
wherein degrees of crystal orientation $F_{(002)}$ and $F_{(102)}$ of the (002) plane and the (102) plane of a surface of the zinc plating layer, as represented by the following Formulae (1) and (2), respectively, are less than 120:

$$F_{(002)} = (R1_{(002)}/R0_{(002)}) \times 100 (\%) \qquad (1)$$

$$F_{(102)} = (R1_{(102)}/R0_{(102)}) \times 100 (\%) \qquad (2)$$

where:
in Formula (1),
$R0_{(002)}$ represents the diffraction peak intensity of the (002) plane of non-oriented zinc, which is 22.1, and $R1_{(002)}$ represents the diffraction peak intensity of the (002) plane of an evaluation sample of zinc; and
in Formula (2),
$R0_{(102)}$ represents the diffraction peak intensity of the (102) plane of non-oriented zinc, which is 8.4, and $R1_{(102)}$ represents the diffraction peak intensity of the (102) plane of the evaluation sample of zinc.

In the metal cord according to the present invention, the degrees of crystal orientation $F_{(101)}$ and $F_{(100)}$ of the (101) plane and the (100) plane of the surface of the zinc plating layer, as represented by the following Formulae (3) and (4), respectively, are preferably 100 or more:

$$F_{(101)} = (R1_{(101)}/R0_{(101)}) \times 100 (\%) \qquad (3)$$

$$F_{(100)} = (R1_{(100)}/R0_{(100)}) \times 100 (\%) \qquad (4)$$

where:
in Formula (3),
$R0_{(101)}$ represents the diffraction peak intensity of the (101) plane of non-oriented zinc, which is 56.4, and $R1_{(101)}$ represents the diffraction peak intensity of the (101) plane of the evaluation sample of zinc, and
in Formula (4),
$R0_{(100)}$ represents the diffraction peak intensity of the (100) plane of non-oriented zinc, which is 13.2, and $R1_{(100)}$ represents the diffraction peak it of the (100) plane of the evaluation sample of zinc.

The metal cord according to the present invention preferably has a brass plating layer inside the zinc plating layer.

Further, in the metal cord according to the present invention, the metal filaments are preferably steel filaments.

The metal cord-rubber composite according to the present invention is a metal cord-rubber composite formed by embedding the metal cord(s) according to the present invention in a rubber composition.

The conveyor belt according to the present invention is a conveyor belt including the metal cord according to the present invention.

Effect of the Invention

According to the present invention, it is possible to provide a metal cord having better adhesion to rubber compared to a conventional one, as well as a metal cord-rubber composite and a conveyor belt, including the same.

MODE FOR CARRYING OUT THE INVENTION

The metal cord according to the present invention will now be described in detail, with reference to the drawings.

The metal cord according to the present invention is a metal cord composed of a plurality of metal filaments twisted together. The twist structure in the metal cord according to the present invention is not particularly limited. The metal cord may be not only a metal cord with a single-twisted structure, a layer-twisted structure or the like, but also a metal cord with a multi-twisted structure, in which metal filaments are twisted together to form a single-twisted or a layer-twisted metal cord, and a plurality of the thus formed metal cords, as strands, are twisted together.

Figure 1:
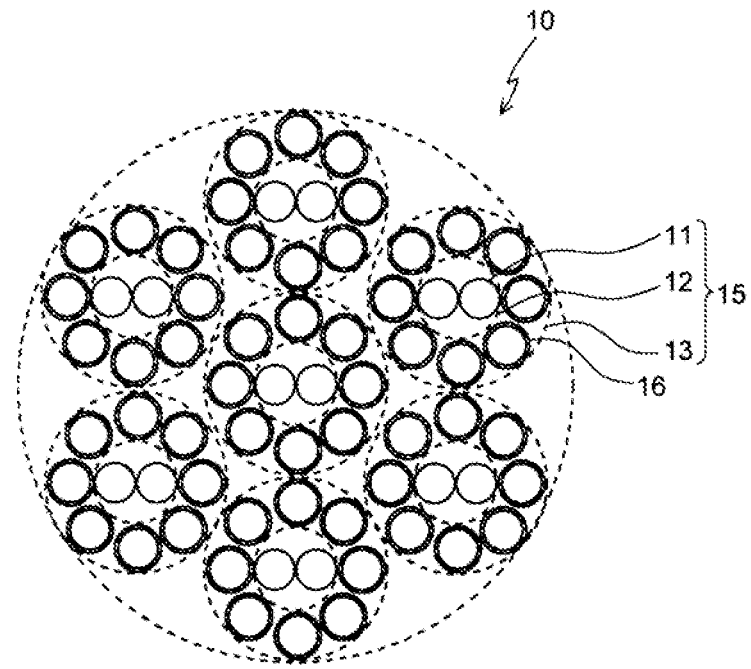
FIG. 1 is a schematic cross-sectional view of a mend cord according to one suitable embodiment of the present invention.
Figure 2:
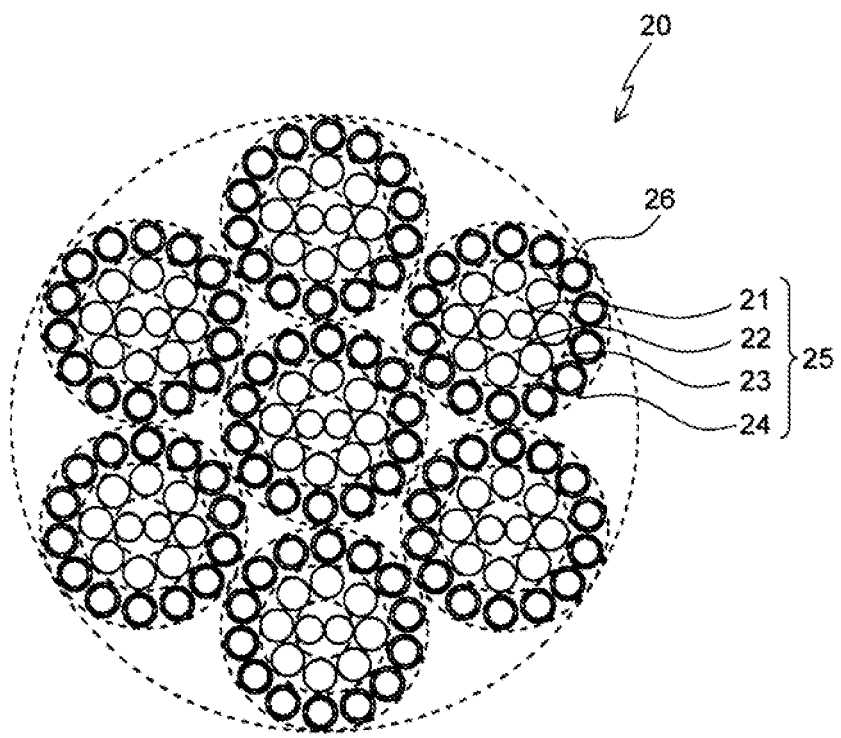
FIG. 2 is a schematic cross-sectional view of a metal cord according to another suitable embodiment of the present invention.

FIG. 1 is a schematic cross-sectional view of a metal cord according to one suitable embodiment of the present invention, and FIG. 2 is a schematic cross-sectional view of a metal cord according to another suitable embodiment of the present invention. A metal cord 10 shown in FIG. 1 is a metal cord having a 7×(2+8) structure, in which: 8 pieces of metal filaments 11, as a sheath layer 13, are twisted together around a core 12 composed of two pieces of metal filaments 11 twisted together, to form a strand 15; and further, 6 pieces of such strands 15 are twisted together around one piece of the strand 15. Further, a metal cord 20 shown in FIG. 2 is a metal cord having a 7×(2+8+14) structure, in which: 8 pieces of metal filaments 21, as a first sheath layer 23, are twisted together around a core 22 composed of two pieces of metal filaments 21 twisted together; 14 pieces of metal filaments 21, as a second sheath layer 24 are then twisted together outside the thus formed first sheath layer 23, to form a strand 25; and further, 6 pieces of such strands 25 are twisted together around one piece of the strand 25.

In the metal cord 10 or 20 according to the present invention, the surfaces of the metal filaments constituting the outermost layer are each provided with a zinc plating layer 16 or 26. By providing the zinc plating layers 16 or 26 as described above, corrosion resistance of the metal cord 10 or 20 can be improved. In the metal cord 10 or 20 according to the present invention, the zinc plating layers 16 or 26 may be formed by zinc electroplating. In the case of a metal cord having a multi-twisted structure, the expression "metal filaments constituting the outermost layer" refers to the metal filaments in the outermost layers, of the strands in the outermost layer of the cord, and the metal filaments in the outermost layer of the core strand may or may not be provided with the zinc plating layers. Further, in the metal cord 10 or 20 according to the present invention, it is required that the metal filaments constituting the outermost layer be provided with the zinc plating layers, but some of the metal filaments other than those also may be provided with the zinc plating layers, or alternatively, all of the metal filaments may be provided with the zinc plating layers.

In the metal cord 10 or 20 according to the present invention, the degrees of crystal orientation $F_{(002)}$ and $F_{(102)}$ of the (002) plane and the (102) plane, of the surface of each of the zinc plating layers 16 or 26 provided on the metal filaments constituting the outermost layer, as represented by the following Formulae (1) and (2), respectively, are less than 120:

$$F_{(002)} = (R1_{(002)}/R0_{(002)}) \times 100(\%) \tag{1}$$

$$F_{(102)} = (R1_{(102)}/R0_{(102)}) \times 100(\%) \tag{2}.$$

The degree of crystal orientation as used herein can be represented by (peak height of zinc plating of evaluation sample)/(peak height of non-oriented zinc). Specifically, the degree of crystal orientation $F_{(002)}$ of the (002) plane can be determined by; measuring the diffraction intensities of the (002) plane, the (102) plane, the (101) plane and the (100) plane of an evaluation sample of Zn, using an X ray diffraction apparatus (XRD); converting $R1_{(002)}$, $R1_{(102)}$, $R1_{(101)}$ and $R1_{(100)}$ into indices such that the total peak intensity is 100; and calculating in accordance with the formula $(R1_{(002)}/R0_{(002)}) \times 100(\%)$. The diffraction line intensity data of non-oriented Zn are determined by converting $R0_{(002)}$, $R0_{(102)}$, $R0_{(101)}$ and $R0_{(100)}$ into indices such that the total peak intensity is 100, with reference to NIST (National Institute of Standards and Technology). Specifically, $R0_{(002)}$ is 22.1, $R0_{(102)}$ is 8.4. $R0_{(101)}$ is 56.4 and $R0_{(100)}$ is 13.2. $F_{(102)}$ can also be calculated in the same manner as $F_{(002)}$.

Zinc-electroplated hexagonal crystal planes are mainly composed of the (002) plane, the (102) plane, the (101) plane and the (100) plane. As described above, when a running test is carried out using a conveyor belt in which, steel cords subjected to zinc electroplating are used as reinforcing materials, and cracks on the zinc plated surfaces of the steel filaments in the outermost layer are observed, the occurrence of twinning de formation is observed on the surface of the (102) plane with a high degree of crystal orientation. In other words, since the (002) plane and the (102) plane are close to parallel with respect to the surface of each metal filament, these planes are susceptible to deformation in the longitudinal direction of the conveyor belt, making crystal destruction more likely to occur. Therefore, the degrees of crystal orientation of the (002) plane and (102) plane, of each of the surfaces of the zinc plating layers 16 or 26 provided on the filaments in the outermost layer, are adjusted to less than 120, so that the crystal destruction is reduced. The degrees of crystal orientation of the (002) plane and the (102) plane are preferably less than 80. In the metal cord according to the present invention, the smaller the lower limits of the degrees of crystal orientation $F_{(002)}$ and $F_{(102)}$ of the (002) plane and the (102) plane are, the more preferred, but the lower limits may be 0 or more.

In the metal cord 10 or 20 according to the present invention, the degrees of crystal orientation $F_{(101)}$ and $F_{(102)}$ of the (101) plane and the (100) plane of the surface of each of the zinc plating layers 16 or 26, as represented by the following Formulae (3) and (4), respectively, are preferably 100 or more:

$$F_{(101)} = (R1_{(101)}/R0_{(101)}) \times 100 (\%) \quad (3)$$

$$F_{(100)} = (R1_{(100)}/R0_{(100)}) \times 100 (\%) \quad (4).$$

The degree of crystal orientation as used herein can be represented by (peak height of zinc plating of evaluation sample)/(peak height of non-oriented zinc). Specifically, the degree of crystal orientation $F_{(101)}$ of the (101) plane can be determined by: measuring the diffraction intensities of the (002) plane, the (102) plane, the (101) plane and the (100) plane of an evaluation sample of Zn, using an X ray diffraction apparatus (XRD); converting $R1_{(002)}$, $R1_{(102)}$, $R1_{(101)}$ and $R1_{(100)}$ into indices such that the total peak intensity is 100; and calculating in accordance with the formula $(R1_{(101)}/R0_{(101)}) \times 100(\%)$. The diffraction line intensity data of non-oriented Zn are determined by converting $R0_{(002)}$, $R0_{(102)}$, $R0_{(101)}$, and $R0_{(100)}$ into indices such that the total peak intensity is 100, with reference to NIST (National Institute of Standards and Technology). Specifically, $R0_{(002)}$ is 22.1, $R0_{(102)}$, is 8.4, $R0_{(101)}$ is 56.4 and $R0_{(100)}$ is 13.2. $F_{(100)}$ is also calculated in the same manner as $F_{(101)}$.

Since the (101) plane and the (100) plane are closer to vertical with respect to the surface of each metal filament as compared to the (002) plane and the (102) plane, the (101) and (100) planes are less likely to be deformed in the longitudinal direction of the conveyor belt. Therefore, the crystal destruction on the surfaces of the zinc plating layers 16 or 26 can be suitably reduced, by increasing the degrees of crystal orientation of these planes.

In the metal cord according to the present invention, the upper limits of the degree of crystal orientation $F_{(101)}$ of the (101) plane and the degree of crystal orientation $F_{(100)}$ of the (100) plane are the higher, the more preferred. However, in the metal cord according to the present invention, the degree of crystal orientation $F_{(101)}$ of the (101) plane can be adjusted to 179 or less, and the degree of crystal orientation $F_{(100)}$ of the (100) plane can be adjusted to 760 or less.

The zinc plating layer 16 or 26 provided on the surfaces of the metal filaments constituting the outermost layer, of the metal cord 10 or 20 according to the present invention, can be formed, for example, by zinc electroplating. In this case, a plating reaction inhibitor can be used to control the crystal orientation of the zinc plating layers. For example, the addition of a plating reaction inhibitor enables to decrease the degrees of crystal orientation of the (002) plane and the (102) plane, and to increase the degrees of crystal orientation of the (101) plane and the (100) plane, of the surface of each of the zinc plating layers 16 or 26. It is possible to use polyethylene glycol, saccharin, an unsaturated alcohol or the like, as the plating reaction inhibitor.

A zinc plating bath having a known composition can be used as the plating bath used in the zinc electroplating, except for adding thereto the plating reaction inhibitor as described above. For example, a known plating bath such as a zinc sulfate bath or a zinc chloride bath can be used. As the zinc sulfate bath, it is possible to use one which contains from 50 to 300 g/L of zinc sulfate (heptahydrate), and to which a mineral acid and/or a supporting electrolyte is added as necessary. Further, as the zinc chloride bath, it is possible to use one which contains from 50 to 300 g/L of zinc chloride (heptahydrate) and to which a mineral acid and/or a supporting electrolyte is added as necessary. The zinc plating bath is preferably carried out at a temperature of from 30 to 70° C. When the temperature of the zinc plating bath is adjusted to 30° C. or higher, a favorable electrodeposition efficiency can be obtained in the zinc electroplating; whereas when the temperature is adjusted to less than 70° C., the energy cost can be reduced. Further, the temperature of the zinc plating bath within the above range is advantageous also from the viewpoint of the concentration management of the plating bath, since it enables to reduce the evaporation of the plating bath.

In the metal cord 10 or 20 according to the present invention, the metal filaments may be made of any material without particular limitation. However, the metal filaments are preferably steel filaments, from the viewpoint of cost and strength. The "steel" namely refers to a metal containing iron as a main component (one in which the mass of iron with respect to the total mass of a metal steel wire is more than 50% by mass). The steel may consist of iron or may contain a metal(s) other than iron, such as zinc, copper, aluminum, and tin.

The metal cord 10 or 20 according to the present invention preferably has a brass plating layer inside each of the zinc plating layers 16 or 26. Such an arrangement improves the adhesion of the metal cord 10 or 20 to rubber. The ratio of copper and zinc (copper:zinc) in the brass plating layer can usually be from 60 to 70:30 to 40 on a mass basis. Further, the brass plating layer can have a layer thickness of from 100 nm to 300 nm.

In the metal cord according to the present invention, the brass plating layer on the metal filament surface can be formed, for example, as follows: a metal filament material is repeatedly subjected to dry wire drawing to achieve a predetermined intermediate wire diameter (dry wire drawing step); the resulting metal filament material is subjected to a patenting treatment (patenting treatment step); the metal filament material after being subjected to the patenting treatment is plated with copper and zinc, in this order, followed by heating to form a brass plating layer (brass plating step); and the resulting brass-plated metal filament material is subjected to continuous wet wire drawing (continuous wet wire drawing step). The dry wire drawing step, the patenting treatment step, and the continuous wet wire drawing step can be carried out under known conditions, and as the copper plating bath and the zinc plating bath, a known copper plating bath and a known zinc plating bath can be used under known conditions.

The metal cord 10 or 20 according to the present invention is not particularly limited, except that the surfaces of the metal filaments constituting the outermost layer are each provided with the zinc plating layer 16 or 26, and that the degrees of crystal orientation of the (002) plane and the (102) plane of the zinc plating layer 16 or 26 are less than 120. For example, the metal cord 10 shown in FIG. 1 has a 7×(2+8) structure, and the metal cord 20 shown in FIG. 2 has a 7×(2+8+14) structure, in which strands 25 having a 2+8+14 structure are twisted together. However, in the metal cord according to the present invention, the cord structure is not limited to a multi-twisted structure, and may have a single-twisted structure or a layer-twisted structure. Further, the twist pitch and the twist direction of the metal filaments 11 or 21, as well as the twist pitch and the twist direction of the strands 15 or 25 are also not particularly limited, and can be set as appropriate, depending on the purpose.

Next, the metal cord-rubber composite according to the present invention will be described.

The metal cord-rubber composite according to the present invention is one formed by embedding the metal cord(s) 10 or 20 according to the present invention in a rubber composition. The rubber to be included in the rubber composition according to the metal cord-rubber composite of the present invention is not particularly limited. Examples of rubber components include natural rubber, polybutadiene rubber, polyisoprene rubber, styrene-butadiene copolymer rubber, acrylonitrile-butadiene copolymer rubber, ethylene-propylene copolymer rubber, ethylene-propylene-diene terpolymer rubber, butyl rubber, halogenated butyl rubber, alkylated chlorosulfonated polyethylene rubber, isobutylene-isoprene copolymer rubber and polychloroprene rubber. In the metal cord-rubber composite according to the present invention, the rubber components may be used singly or in combination of two or more thereof.

The metal cord-rubber composite according to the present invention may contain any component commonly used in the rubber industry, as appropriate, in addition to any of the above-described rubber components, to the extent that the object of the present invention is not impaired. Examples of other components include, vulcanizing agents such as sulfur; fillers such as silica and carbon black, oils such as process oils; vulcanization accelerators; anti-aging agents; softening agents; zinc oxide and stearic acid.

The rubber composition according to the metal cord-rubber composite of the present invention can be produced by kneading each of these components by an ordinary method, followed by warming, extrusion, and the like.

The metal cord-rubber composite according to the present invention can be produced by: arranging the metal cords according to the present invention in parallel at predetermined intervals; coating both sides of the thus arranged metal cords with a non-crosslinked rubber sheet composed of the above-described rubber composition and having a thickness of about 5.0 mm: and subjecting the resultant to a vulcanization treatment at a temperature of about 160° C. for about 20 minutes.

Next, the conveyor belt according to the present invention will be described.

The conveyor bell according to the present invention is one which includes the metal cord according to the present invention, and particularly, one in which the metal cord or cords according to the present invention are used as reinforcing materials in the circumferential direction of the conveyor belt. In particular, since the metal cord according to the present invention has excellent adhesion to rubber, as described above, the conveyor belt according to the present invention has excellent durability. The conveyor bell according to the present invention is not particularly limited, except for including the metal cord according to the present invention, and any known structure and material can be used.

Further, the method of producing the conveyor belt according to the present invention is not particularly limited, as well, and the conveyor belt can be produced by a known method. For example, the conveyor belt can be produced as follows: a rubber composition for a conveyor belt is formed in the form of sheets by extrusion molding (a known molding method such as calendaring); the metal cord or cords according to the present invention, which are reinforcing materials, are used as core materials, and the resulting rubber-molded products (the rubber composition for a conveyor belt) in the form of sheets are pasted so as to cover the metal cords; and the resultant is then subjected to a vulcanization treatment by an ordinary method.

EXAMPLES

The present invention will now be described in more specific detail, with reference to Examples.

Examples 1 to 4 and Comparative Example

Steel cords having the structures shown in Tables 1 and 2 were prepared, using three kinds of steel filaments having a wire diameter of 0.525 mm, 0.46 mm and 0.395 mm. The steel filaments had been plated with brass, and the surfaces of the steel filaments constituting the outermost layer of each steel cord were plated with zinc. The composition of the zinc plating bath used in the zinc plating and the conditions for the zinc electroplating are as follows. The degree of crystal orientation F was adjusted by changing the concentration of the plating reaction inhibitor.

(Composition of Zinc Plating Bath)

Zinc sulfate: 300 g/L

Sulfuric acid: 1 g/L pH: 3

Plating reaction inhibitor: saccharin

Concentration of plating reaction inhibitor: from 0.5 to 3.0 g/L

Plating tank temperature: 30° C.

Current density: 12.5 A/dm$^2$

The values of $F_{(002)}$, $F_{(102)}$, $F_{(101)}$ and $F_{(100)}$ of the surface of each of the zinc plating layers formed on the surfaces of the resulting steel filaments were calculated using an XRD apparatus (D8 DISCOVER, manufactured by Bruker Corporation). The measurement conditions were as follows. The results obtained are shown in Tables 1 and 2.

(X Ray Diffraction Measurement Conditions)

X ray source: chromium

Output: 38 kV

The resulting steel cords were used as reinforcing materials in the circumferential direction to prepare conveyor belts of Examples and Comparative Example, and the durability of each conveyor belt was evaluated by carrying out a running test in accordance with the following procedure. The structure of each conveyor belt was ST1600.

<Running Test>

Each conveyor belt having a circumference of 11.6 m was set on a pulley having a pulley diameter of 1,200 mm, and a running test was carried out at a belt speed of 250 m/min and under a predetermined bell tension. The belt tension was applied by repealing a cycle consisting of: increasing from a minimum of 154 kg/cord to a maximum of 1,246 kg/cord over 42 seconds; and then decreasing to a minimum of 154 kg/cord over 8 seconds. The result is expressed with the time until the conveyor belt of Comparative Example 1 broke down is taken as an index of 100. A higher value as obtained above indicates higher durability of the conveyor belt.

TABLE 1

|  | Example 1 | Example 2 | Example 3 |
|---|---|---|---|
| Steel cord structure | (2 × 0.525 + 8 × 0.46) + 6 × (2 × 0.46 + 8 × 0.395) | (2 × 0.34 + 8 × 0.28) + 6 × (2 × 0.28 + 8 × 0.23) | (2 × 0.615 + 8 × 0.555) + 6 × (2 × 0.555 + 8 × 0.50) |
| $F_{(002)}$ | 20 | 22 | 17 |
| $F_{(102)}$ | 78 | 79 | 83 |
| $F_{(101)}$ | 125 | 129 | 126 |
| $F_{(100)}$ | 140 | 122 | 137 |
| Durability | 435 | 430 | 389 |

TABLE 2

|  | Example 4 | Comparative Example |
|---|---|---|
| Steel cord structure | (2 × 0.575 + 8 × 0.515 + 14 × 0.455) + 6 × (2 × 0.455 + 8 × 0.395 + 14 × 0.335) | (2 × 0.525 + 8 × 0.46) + 6 × (2 × 0.46 + 8 × 0.395) |
| $F_{(002)}$ | 22 | 38 |
| $F_{(100)}$ | 85 | 169 |
| $F_{(101)}$ | 127 | 121 |
| $F_{(100)}$ | 127 | 69 |
| Durability | 378 | 100 |

Based on the above results, it can be seen that the metal cord according to the present invention has excellent adhesion to rubber, and is particularly suitable as a reinforcing material for a conveyor belt.

DESCRIPTION OF SYMBOLS 10, 20 metal cord
11, 21 metal filament
12, 22 core
13, 23 first sheath layer
24 additional second sheath layer
15, 25 strand
16, 26 zinc plating layer

The invention claimed is:

1. A metal cord composed of a plurality of metal filaments twisted together,
characterized in that surfaces of the metal filaments constituting an outermost layer are each provided with a zinc plating layer,
wherein degrees of crystal orientation $F_{(002)}$ and $F_{(102)}$ of the (002) plane and the (102) plane of a surface of the zinc plating layer, as represented by the following Formulae (1) and (2), respectively, are less than 120:

$$F_{(002)} = (R1_{(002)}/R0_{(002)}) \times 100 (\%) \quad (1)$$

$$F_{(102)} = (R1_{(102)}/R0_{(102)}) \times 100 (\%) \quad (2)$$

where:
in Formula (1),
$R0_{(002)}$ represents the diffraction peak intensity of the (002) plane of non-oriented zinc, which is 22.1, and $R1_{(002)}$ represents the diffraction peak intensity of the (002) plane of an evaluation sample of zinc; and
in Formula (2),
$R0_{(102)}$ represents the diffraction peak intensity of the (102) plane of non-oriented zinc, which is 8.4, and $R1_{(102)}$ represents the diffraction peak intensity of the (102) plane of the evaluation sample of zinc.

2. The metal cord according to claim 1, wherein the degrees of crystal orientation $F_{(101)}$ and $F_{(100)}$ of the (101) plane and the (100) plane of the surface of the zinc plating layer, as represented by the following Formulae (3) and (4), respectively, are 100 or more:

$$F_{(101)} = (R1_{(101)}/R0_{(101)}) \times 100 (\%) \quad (3)$$

$$F_{(100)} = (R1_{(100)}/R0_{(100)}) \times 100 (\%) \quad (4)$$

where:
in Formula (3),
$R0_{(101)}$ represents the diffraction peak intensity of the (101) plane of non-oriented zinc, which is 56.4, and $R1_{(101)}$ represents the diffraction peak intensity of the (101) plane of the evaluation sample of zinc; and
in Formula (4),
$R0_{(100)}$ represents the diffraction peak intensity of the (100) plane of non-oriented zinc, which is 13.2, and $R1_{(100)}$ represents the diffraction peak intensity of the (100) plane of the evaluation sample of zinc.

3. The metal cord according to claim 1, having a brass plating layer inside the zinc plating layer.

4. The metal cord according claim 1, wherein the metal filaments are steel filaments.

5. A metal cord-rubber composite formed by embedding the metal cord(s) according to claim 1, in a rubber composition.

6. A conveyor belt comprising the metal cord according to claim 1.

7. The metal cord according to claim 2, having a brass plating layer inside the zinc plating layer.

8. The metal cord according claim 2, wherein the metal filaments are steel filaments.

9. A metal cord-rubber composite formed by embedding the metal cord(s) according to claim 2, in a rubber composition.

10. A conveyor belt comprising the metal cord according to claim 2.

11. The metal cord according claim 3, wherein the metal filaments are steel filaments.

12. A metal cord-rubber composite formed by embedding the metal cord(s) according to claim 3, in a rubber composition.

13. A conveyor belt comprising the metal cord according to claim 3.

14. A metal cord-rubber composite formed by embedding the metal cord(s) according to claim 4, in a rubber composition.

15. A conveyor belt comprising the metal cord according to claim 4.

16. The metal cord according claim 7, wherein the metal filaments are steel filaments.

17. A metal cord-rubber composite formed by embedding the metal cord(s) according to claim 7, in a rubber composition.

18. A conveyor belt comprising the metal cord according to claim 7.

19. A metal cord-rubber composite formed by embedding the metal cord(s) according to claim 8, in a rubber composition.

20. A conveyor belt comprising the metal cord according to claim 8.

* * * * *